H. J. FORSTER.
CIRCLE GUIDE FOR OXYACETYLENE TORCHES.
APPLICATION FILED AUG. 11, 1919.
1,351,846.
Patented Sept. 7, 1920.
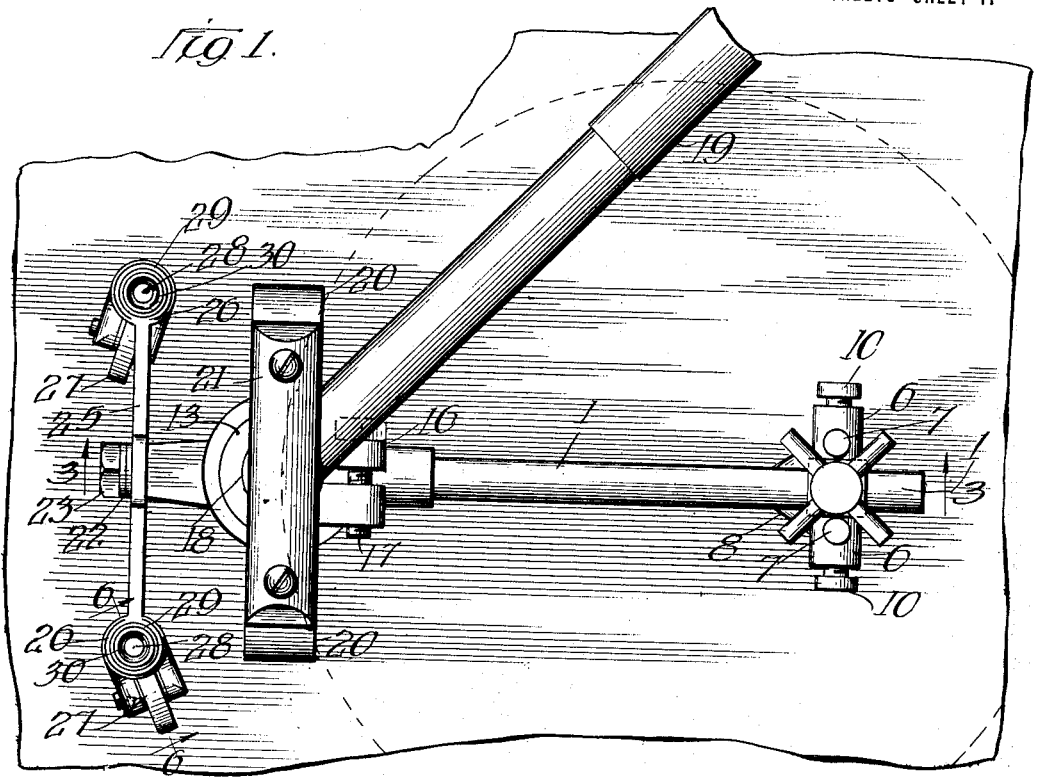
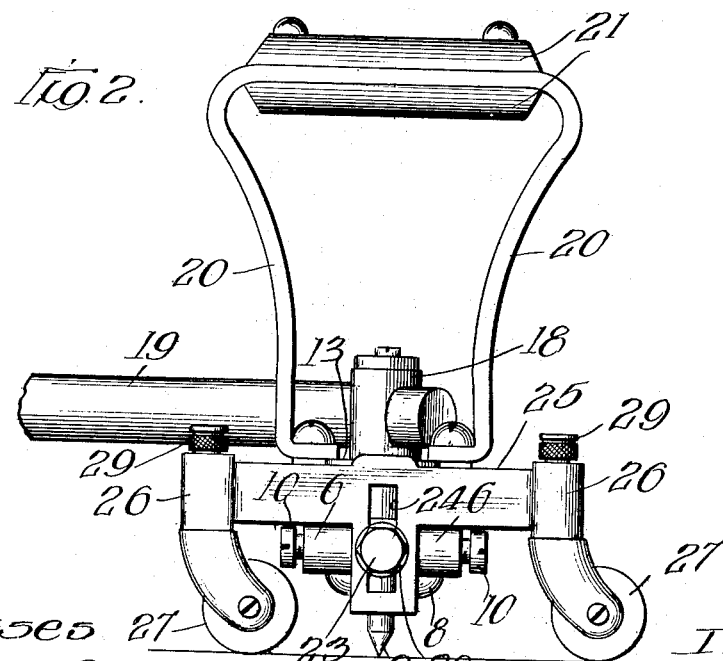
Witnesses
Harry R. Leohite.
W. P. Kilroy
Inventor
Harry J. Forster
By Rudolph Wm. Lotz Atty

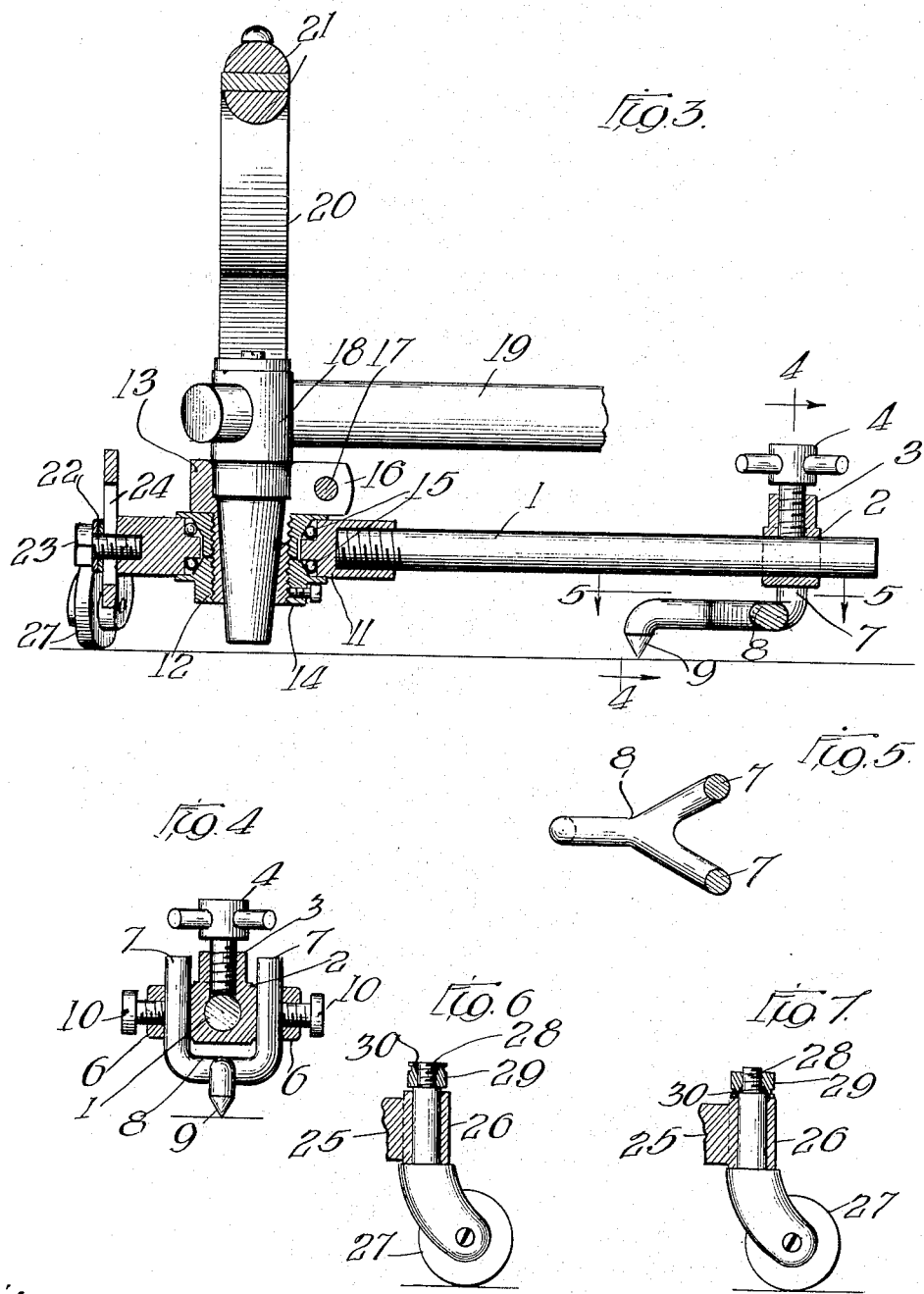

UNITED STATES PATENT OFFICE.

HARRY J. FORSTER, OF CHICAGO, ILLINOIS.

CIRCLE-GUIDE FOR OXYACETYLENE-TORCHES.

1,351,846.

Specification of Letters Patent.   Patented Sept. 7, 1920.

Application filed August 11, 1919.   Serial No. 316,823.

*To all whom it may concern:*

Be it known that I, HARRY J. FORSTER, citizen of the United States, residing at Chicago, in the county of Cook and State of Illinois, have invented certain new and useful Improvements in Circle-Guides for Oxyacetylene-Torches; and I do hereby declare the following to be a full, clear, and exact description of the invention, such as will enable others skilled in the art to which it appertains to make and use the same.

This invention has for its object to provide a circle cutting device for guiding the discharge end or nozzle of an oxyacetylene torch to accurately and easily cut circular openings in metal plates or structures for which such torches are particularly adapted.

A further object of the invention is to provide a circle cutting device of the character defined which is adapted to be rigidly engaged with the torch and is equipped with means whereby rotation of the mouth of the torch relative to operating parts of the mechanism is rendered very free and easy so as to avoid any possibility of hesitation or interruption of the continuous movement of the torch to cut the opening desired.

A further object of the invention is to provide a device of the character defined which is so constructed and arranged as to provide three points of support for the carriage thereof on the surface to be operated upon whereby the operation thereof is rendered very free and easy and slippage of the centering element is obviated.

A further object of the invention is to provide means whereby two rotatable supporting elements for the carriage may under certain conditions be locked against pivotal movement about axes transverse to their axes of rotation.

Other objects of the invention will be fully understood from the following specification.

The invention consists in the features of constructions and combinations of parts hereinafter fully described and particularly claimed.

In the accompanying drawings illustrating a suitable embodiment of the invention:

Figure 1 is a top plan view of a circle guide for oxy-acetylene torches constructed in accordance with the invention.

Fig. 2 is a front elevation of the same.

Fig. 3 is a central vertical longitudinal section of the same on the line 3—3 of Fig. 1.

Fig. 4 is a detail transverse section on the line 4—4 of Fig. 3.

Fig. 5 is a detail plan section on the line 5—5 of Fig. 3.

Figs. 6 and 7 are fragmentary detail sections on the line 6—6 of Fig. 1 showing the parts in respectively different positions.

Referring now to said drawings:

1 indicates a rod on which a sleeve 2 is longitudinally movable, the latter being provided with an internally threaded boss 3 to receive a set screw 4 by means of which it may be rigidly clamped upon any part of the rod 1. Said sleeve is provided with hollow threaded bosses 6 extending transversely to the boss 3, and which are provided with openings parallel with the axis of the boss 3 through which the projections 7 at one end of a Y-shaped centering element 8 having a needle point 9 projects. The needle point 9 of said member projects in the opposite direction from the projections 7 and the latter are vertically movable in said openings in the bosses 6 and held firmly at any desired elevation by means of set screws 10. One end of said rod is equipped with a head 11 with which it is suitably rigidly engaged and said head is provided between its ends with a vertical opening or bearing through which the externally threaded sleeve 12 of a clamping element 13 projects, said threaded sleeve being adapted to engage the several parts of ball bearings 14 in a well known manner, the opening or bearing in the head 11 through which said sleeve projects being shaped to coact with the parts carried by the sleeve to complete the ball bearings. The clamping element 13 consists of a split sleeve terminating in opposed flanges 16 in which a transverse bolt 17 engages for contracting said clamp in a well known manner. Said clamp is adapted to receive and rigidly engage the discharge nozzle 18 of an oxy-acetylene blow torch 19. Rigidly secured to said sleeve 13 or a part such as one of the ball bearing members rigid therewith are the two arms 20 of an inverted U-shaped operating handle, the middle portion of which is preferably provided with a covering of non-heat conducting material 9 such as the blocks 21 of wood shown, though any other suitable material may be substituted.

At the end opposite its connection with the rod 1, said head 11 terminates in a rectangular projection having 22 central screw or bolt 23. The said projection 22 is adapted to engage in a longitudinal slot 24 of a cross-head 25 provided at its ends with bearings 26 for the pintles of caster wheels 27. The cross head 25 is composed of sheet metal of greater thickness than the length of the projections 22 so that when the set screw 23 is forced home the head thereof or a washer engaged thereby, will bear upon the outer face of said cross head on either side of the slot 24 to firmly clamp the same upon the head 11. The slot 24 extends parallel with the openings for the projections 7 of the centering point 9 and also parallel with the axis of the ball bearing aforesaid. The slot 24 and the projection 7 are both of such length as to permit of a considerable latitude of adjustment to vary the distance of the discharge end of the nozzle 18 of the torch from the surface engaged by the center point and caster wheels in an obvious manner.

The said pintles of the caster wheels 27 are of slightly greater length than the bearings 26 therefor and at their upper ends are provided with threaded projections concentric with but of smaller diameter than said pintles. Each of these threaded projections is adapted to engage in the threaded opening and a nut 29, the threaded opening of which is countersunk, as at 30, at one end so that when reversed from the position, as shown in Fig. 6 and positioned as shown in Fig. 7, the projecting upper end portions of the pintles of the caster wheels will be received in said countersunk portion of the nut opening and the end of the latter thus caused to bear upon the upper end of the bearing 26 whereby the pintles of the caster wheels may be locked against pivotal movement in said bearing. When, however, the nut 29 is disposed, as shown in Fig. 6, it will act only as a stop to limit the longitudinal movement of the pintle relatively to the bearing to prevent the same from becoming disengaged from the bearing.

From the foregoing description it will be seen that the device may be adjusted to guide the blower torch to describe a circle of any desired radius within the limits of the length of the rod 1 which may be varied as desired, and that the distance of the discharge end of the blower torch from the surface to be operated upon may be varied within the limits of the length of the slot 24 in the cross-head and the length of the projections of centering element. When the torch-nozzle 18 is rigidly engaged in the clamp 13 and pressure is exerted upon said handle toward the surface acted upon, the device will bear upon said surface at the three points of engagement of the center point 9 and caster wheels 27, thus decreasing the liability of slippage of the needle point 9 and, by reason of the freedom of motion of the caster wheels 7 prevent any hesitation in the rotation of the head 11 about the needle point as, in practice may be due to slight inequalities or obstructions presented by the surface operated upon and offering resistance to travel of the caster-wheels. The ball bearings assure great ease of rotation of the handle 20 and torch 19 relatively to the head 11. The handle may be firmly held and rotated about the axis 9 and at the same time about its own axis without varying its position relatively to the body of the operator, and by reason of the lack of resistance to rotation assured by the ball bearings, aforesaid, the operator, even though relatively unskilled may very accurately cut circular openings in sheets and plates.

The caster wheels will obviously readily adjust themselves to travel in the prescribed circle so long as they are traveling over a horizontal or substantially horizontal surface, but if the surface to be acted upon is vertically disposed, then it is desirable that the caster-wheels be fixed in proper relative position to describe the desired arc in travel, this being effected by first reversing the nuts 29 from the position shown in Fig. 6 to that shown in Fig 7 and before tightening said nuts causing the caster-wheels to travel in a horizontal surface for adjusting themselves about the axes of the pintles thereof, whereupon the nuts are tightened to hold said pintles against rotation in the bearings 26. The device is then ready for use on a vertical or substantially vertical surface as will be obvious.

In some instances, especially where the circular opening to be cut is of very small diameter, the cross-head carrying the caster-wheels may be removed in order to render the device more freely rotatable about the point 9 to prevent the burning away of too much metal in the course of describing the circle. When so employed, the operator may very easily cause sufficient pressure to be maintained on the point 9 while maintaining the discharge nozzle of the torch reasonably accurately spaced from the surface being acted upon to hold said point 9 firmly engaged with said surface, but where the diameter of the circular opening to be cut is relatively large the use of the caster-wheels is decidedly advantageous.

While I have shown the preferred embodiment of the invention in the accompanying drawings, it will be understood, of course, that such embodiment may be changed and varied in details of constructions without departing from the invention as defined in the appended claims.

I claim as my invention:

1. A circle guide for an oxy-acetylene torch comprising a carriage, a center point rigid therewith for engaging a surface to be operated upon and affording a fulcrum about which the carriage is adapted to be manually rotated, rotatable supporting means for the outer end of the carriage, a member rotatably mounted between the ends of said carriage, and means on said rotatable member for firmly engaging a torch nozzle therewith, said center point and said supporting means coacting to support the nozzle at a predetermined elevation above the surface to be acted upon and said rotatable member permitting the torch to be rotated about the center point as an axis without being rotated about its own axis.

2. A circle guide for an oxy-acetylene torch comprising a carriage, a center point rigid therewith for engaging a surface to be operated upon and affording a fulcrum about which the carriage is adapted to be manually rotated, rotatable supporting means for the outer end of the carriage, a member rotatably mounted between the ends of said carriage, and means on said rotatable member for firmly engaging a torch nozzle therewith, said center point and said supporting means coacting to support the nozzle at a predetermined elevation above the surface to be acted upon, and a manually engageable operating handle rigid with said rotatable member for effecting rotation of said carriage while maintaining the center point and supporting means thereof firmly engaged with the surface to be operated.

3. A center guide for torches comprising a carriage, a member rotatably mounted therein between the ends thereof, means carried by said member for rigidly engaging a torch nozzle, a center-point adjustably engaged with one end of said carriage, and having its point of engagement with said carriage offset from its needle end in a direction radially of said rotatable member and adapted to be reversed to increase its latitude of adjustment, said center point adjustable in two directions for varying the radius of the circle to be cut and for varying the elevation of the nozzle with respect to the surface operated upon, a cross-head carrying a pair of caster-wheels mounted on the other end of said carriage, and a manually engageable element rigid with said rotatable member for effecting rotation of the carriage.

4. A center guide for torches comprising a carriage, a member rotatably mounted therein between the ends thereof, means carried by said member for rigidly engaging a torch nozzle, a center-point adjustably engaged with one end of said carriage, and having its point of engagement with said carriage offset from its needle end in a direction radially of said rotatable member and adapted to be reversed to increase its latitude of adjustment, said center point adjustable in two directions for varying the radius of the circle to be cut and for varying the elevation of the nozzle with respect to the surface operated upon, a cross-head carrying a pair of caster-wheels at its ends mounted on the other end of said carriage and adjustable parallel with the axis of said rotatable member for coaction with centering point to vary the elevation of the nozzle from the surface to be operated upon, and a manually engageable element rigid with said rotatable member for effecting rotation of the carriage.

5. A circle guide for torches comprising a carriage equipped with three supporting elements, two of the latter being rotatable relatively to the carriage for promoting ease of travel and the other constituting the center-point about which the carriage is adapted to rotate, a bearing in said carriage disposed within the area of a triangle of which said supports form the corners, a torch-nozzle engaging element mounted to rotate in said bearing, anti-friction means interposed between opposed surfaces of said bearing and said nozzle engaging element, and a handle rigid with the latter for rotating the carriage about its axis and at the same time rotating said nozzle engaging element relatively to said carriage.

6. A circle guide for torches comprising a carriage equipped with three supporting elements, two of the latter being rotatable relatively to the carriage for promoting ease of travel and the other constituting the center-point about which the carriage is adapted to rotate, a bearing in said carriage disposed within the area of a triangle of which said supports form the corners, a torch-nozzle engaging element mounted to rotate in said bearing, anti-friction means interposed between opposed surfaces of said bearing and said nozzle engaging element, and a handle rigid with the latter for rotating the carriage about its axis and at the same time rotating said nozzle engaging element relatively to said carriage, and means associated with said carriage and said supporting means therefor for varying the diameter of the circle to be described by the nozzle and varying the elevation of the same relatively to the surface to be operated upon.

7. In a device of the kind specified, a carriage, a pair of caster-wheels for supporting one end thereof, bearings on said carriage for the pintles of the caster-wheels, and manually operable means associated with said bearings and pintles for firmly holding said pintles against rotation in said bearings.

8. In a device of the kind specified, a carriage, a pair of caster-wheels for supporting one end thereof, bearings of said carriage for the pintles of the caster-wheels, the latter of slightly greater length than said bearings, threaded projections at the outer ends of said pintles, and reversible nuts on said projections having their openings countersunk at one end to permit said pintles to project into the same a distance greater than their projection from said bearings and adapted to engage the latter to hold said pintles against rotation, and adapted to be reversed to form collars for limiting the longitudinal movement of the pintles relatively to the bearings while permitting free rotation thereof.

9. A circle guide for torches comprising a carriage equipped with three supporting elements, two of the latter being rotatable relatively to the carriage for promoting ease of travel and the other constituting the center-point about which the carriage is adapted to rotate, a bearing in said carriage disposed within the area of a triangle of which said supports form the corners, a torch-nozzle engaging element mounted to rotate in said bearing, and a handle rigid with the latter for rotating the carriage about its axis and at the same time rotating said nozzle engaging element relatively to said carriage, pintles carrying said rotatable supports rotatably engaged with said carriage for permitting said rotatable elements to adjust themselves to travel in circles of different diameters, and means associated with the carriage and said pintles for firmly holding the latter against rotation relatively to said carriage.

10. In a device of the kind described, a head, a center point rigid therewith for engaging the surface to be operated upon and affording a relatively fixed center about which the head is adapted to be rotated, a torch holding member rotatably mounted in the head, anti-friction bearings upon which said member is rotatable, and a handle rigid with said member and arranged in substantial axial alinement therewith for manually controlling said head in its rotation about the center.

11. The combination with an ordinary right angled torch of means for cutting a circle with the torch comprising a head, a member for receiving and firmly clamping the nozzle of the torch rotatably mounted in the head, and a handle rigid with said rotatable member for controlling said head as it is rotated around the center and for holding said torch in a relatively fixed relation.

12. In a device for mounting an ordinary right angled torch for cutting circles, a head, a rotatable member carried by the head, means for firmly clamping the nozzle of a torch in said member, a center point fixed relatively to the head for engaging a surface to be operated upon, and a handle fixed to said rotatable member in substantial axial alinement therewith for controlling the head and the torch as the head is swung around the center.

13. In a device of the kind described, a head, a center point rigid with the head for engagement with a surface to be operated upon, a member rotatably mounted in said head, means for clamping a right angled torch in said member, a spade handle above said member and rigidly carried thereby, the transverse center point of the handle being arranged substantially in the extended axis of said member, for controlling the movement of the head around the center point.

14. In a circle cutting torch device, a head, a center point rigid with the head, a torch rotatably carried by the head, anti-friction bearings mounting the torch in the head, the bearings permitting the easy rotation of the torch while holding the nozzle of the torch rigidly at right angles to the surface to be operated upon, whereby holding face to be operated upon, whereby holding pressure can be applied to the center point without disturbing the accuracy of the cut being made.

HARRY J. FORSTER.